(12) United States Patent
Guering et al.

(10) Patent No.: US 10,669,012 B2
(45) Date of Patent: Jun. 2, 2020

(54) AIRCRAFT CONTROL COMPRISING AN IMPROVED PEDAL

(71) Applicant: AIRBUS OPERATIONS (S.A.S.), Toulouse (FR)

(72) Inventors: Bernard Guering, Montrabe (FR); Matthieu De Kergommeaux, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 494 days.

(21) Appl. No.: 15/471,450

(22) Filed: Mar. 28, 2017

(65) Prior Publication Data

US 2017/0283037 A1   Oct. 5, 2017

(30) Foreign Application Priority Data

Apr. 5, 2016   (FR) ...................................... 16 52981

(51) Int. Cl.
| | | |
|---|---|---|
| *B64C 13/04* | (2006.01) | |
| *G05G 1/30* | (2008.04) | |
| *B64C 27/56* | (2006.01) | |
| *G05G 1/48* | (2008.04) | |
| *B64D 13/08* | (2006.01) | |

(52) U.S. Cl.
CPC ............ *B64C 13/044* (2018.01); *B64C 13/04* (2013.01); *B64C 27/56* (2013.01); *B64D 13/08* (2013.01); *G05G 1/30* (2013.01); *G05G 1/48* (2013.01)

(58) Field of Classification Search
CPC ....... B64C 13/044; B64C 13/04; B64C 27/56; G05G 1/48; G05G 1/30; B64D 13/08
See application file for complete search history.

(56) References Cited

U.S. PATENT DOCUMENTS

| | | | |
|---|---|---|---|
| 2,048,448 A | | 7/1936 | Hofer |
| 2,424,523 A | * | 7/1947 | Watter .................... B64C 25/44 |
| | | | 244/235 |
| 2008/0023591 A1 | * | 1/2008 | Christensen .......... B64C 13/044 |
| | | | 244/235 |

FOREIGN PATENT DOCUMENTS

| | | |
|---|---|---|
| CN | 103605400 A | 2/2014 |
| EP | 2626299 A1 | 8/2013 |

OTHER PUBLICATIONS

French Search Report for Application No. 1652981 dated Oct. 26, 2016.

* cited by examiner

*Primary Examiner* — Valentina Xavier
(74) *Attorney, Agent, or Firm* — Jenkins, Wilson, Taylor & Hunt, P.A.

(57) ABSTRACT

An aircraft control of the rudder bar type, which includes a box-shaped pedal, a support, a first rotation shaft connecting the pedal to the support with a first rotation axis, a first pivot connection configured to allow the pedal to pivot about the first rotation axis relative to the support, a rod, a second rotation shaft, distinct from the first rotation shaft and connecting the pedal to the rod with a second rotation axis, and a second pivot connection configured so as to allow the pedal and/or the rod to pivot about the second rotation axis.

9 Claims, 3 Drawing Sheets

AIRCRAFT CONTROL COMPRISING AN IMPROVED PEDAL

CROSS-REFERENCE TO RELATED APPLICATION

This application claims priority to French Patent Application FR 16 52981 filed Apr. 5, 2016, the entire disclosure of which is incorporated by reference herein.

TECHNICAL FIELD

The present disclosure relates to an aircraft control comprising an improved pedal.

BACKGROUND

FIG. 1 is a partial view of a set of controls 10 of an aircraft, also called the rudder bar, which is positioned in the cockpit of the aircraft. Generally, a cockpit comprises as many sets of controls 10 as there are pilot stations.

According to one embodiment, each set of controls 10 comprises a first pedal 12 and a second pedal 14 which may be actuated simultaneously or independently of one another.

For each pedal 12, 14, the set of controls 10 comprises, among other things:
  a support 16,
  a rotation shaft 18 with a rotation axis A18,
  pivoting connection 20 between the support 16 and the rotation shaft 18, this connection being configured so as to allow the rotation shaft 18 to pivot on itself about the rotation axis A18,
  two fixed connections 22 which connect the pedal 14 or 16 to the rotation shaft 18,
  an arm referred to as a bell crank 24 which extends perpendicular to the rotation axis A18, and which is connected by one of its ends to the rotation shaft 18,
  a rod 26,
  an articulation 28 which connects the rod 26 and the other end of the bell crank 24.

According to this configuration, a movement of the rod 26 is converted into a rotational movement of the pedal 12, 14 about the rotation axis A18 or, vice versa, a rotational movement of the pedal 12, 14 about the rotation axis A18 is converted into a movement of the rod 26.

Although this embodiment is quite satisfactory in terms of function, it requires a large number of parts (support, pedal, rotation shaft, bell crank, rod) which is generally disadvantageous in terms of assembly costs. In order to transmit forces between the pedal and the rod, the rotation shaft 18 and the bell crank 24 must have high mechanical strength owing to their L-shaped arrangement, which generally tends to increase production costs.

SUMMARY

The present disclosure aims to remedy the drawbacks of the prior art.

To that end, the disclosure herein relates to an aircraft control of the rudder bar type, positioned in an aircraft cockpit, which comprises a pedal, a support, a first rotation shaft connecting the pedal to the support with a first rotation axis, a first pivot connection configured to allow the pedal to pivot about the first rotation axis relative to the support, a rod whose movements are coordinated with the pivoting motion of the pedal.

According to the disclosure herein, the control is characterized in that the control comprises:
  a second rotation shaft with a second rotation axis, the second rotation shaft being distinct from the first rotation shaft and connecting the pedal to the rod; and
  a second pivot connection configured so as to allow the pedal and/or the rod to pivot about the second rotation axis, and
  wherein the pedal is box-shaped.

According to the disclosure herein, the control has a reduced number of parts since the control comprises no bell crank. This function is fulfilled by the pedal. According to another advantage, the first rotation shaft is optimized for transmitting the forces between the pedal and the support, and the second rotation shaft is optimized for transmitting the forces between the pedal and the rod. In contrast to the prior art, the same shaft does not bear all of the forces between the pedal and the support and between the pedal and the rod.

The box shape of the pedal favors the transmission of forces between the first and second rotation shafts.

Preferably, the pedal comprises a contact plate having a contact surface that is configured to receive a pilot's foot, the box shape being positioned at a rear surface of the contact plate.

According to another feature, the pedal comprises a plurality of orifices that are configured to connect the interior of the pedal with the exterior, and an airflow generator that is configured to generate a flow of air from the exterior of the pedal to the interior of the pedal.

Preferably, the pedal comprises a first set of orifices positioned at the contact plate, and/or a second set of orifices positioned at a wall of the pedal oriented toward the cockpit floor.

According to another feature, the pedal comprises a system for heating the air.

Preferably, the pedal comprises:
  a contact plate that comprises a lower edge which is parallel to the first rotation axis and at which is positioned the first rotation shaft, two lateral edges and an upper edge that is spaced apart from the first rotation axis;
  two lateral flanks that are perpendicular to the contact plate and are connected to the lateral edges; and
  a rear wall which connects the two lateral flanks, the lower and upper edges of the contact plate, the lateral flanks and the rear wall being configured so as to delimit, with the contact plate, a cavity.

Advantageously, the rear wall comprises a first part that is connected to the lower edge of the contact plate and is oriented toward the cockpit floor, and a second part that is connected to the upper edge of the contact plate, approximately perpendicular to the first part, and the pedal comprises a first set of orifices which open at the contact surface, a second set of orifices which pass through the first part of the rear wall, and an airflow generator which is positioned at the second part of the rear wall.

According to another feature, the pedal comprises a contact plate, a half-shell that is distinct from the contact plate and is configured so as to delimit, with the contact plate, a cavity, and at least one connection connecting the contact plate and the half-shell.

According to one embodiment, the first rotation shaft and the second rotation shaft are respectively secured to the support and to the rod, the first pivot connection is positioned between the pedal and the first rotation shaft, and the second pivot connection is positioned between the pedal and the second rotation shaft.

According to another embodiment, the first rotation shaft and the second rotation shaft are secured to the pedal, the first pivot connection is positioned between the support and the first rotation shaft, and the second pivot connection is positioned between the rod and the second rotation shaft.

The disclosure herein also relates to an aircraft equipped with an aircraft control in accordance with the disclosure herein.

BRIEF DESCRIPTION OF THE DRAWINGS

Other characteristics and advantages will emerge from the ensuing description of the disclosure herein, description given solely by way of example, with regard to the appended drawings in which.

DETAILED DESCRIPTION

Figure 1:
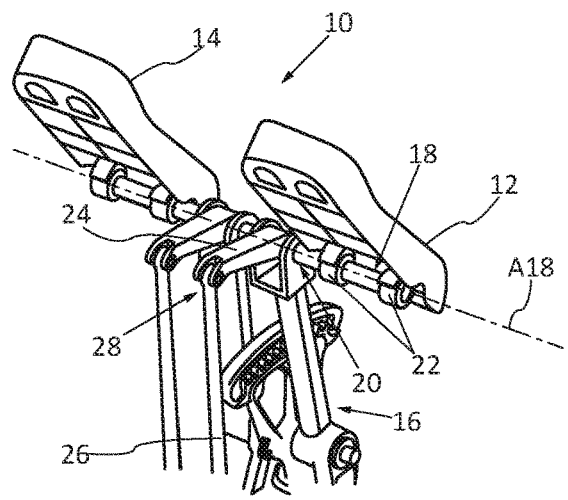
FIG. 1 is a perspective view of a set of controls which illustrates an embodiment of the prior art.
Figure 2:
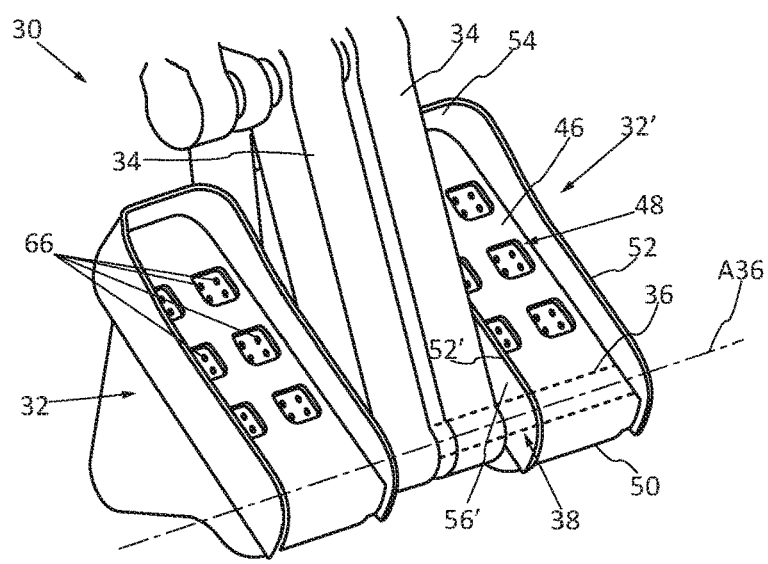
FIG. 2 is a perspective view, from a first viewpoint, of a set of controls which illustrates a first embodiment according to the disclosure herein.
Figure 3:
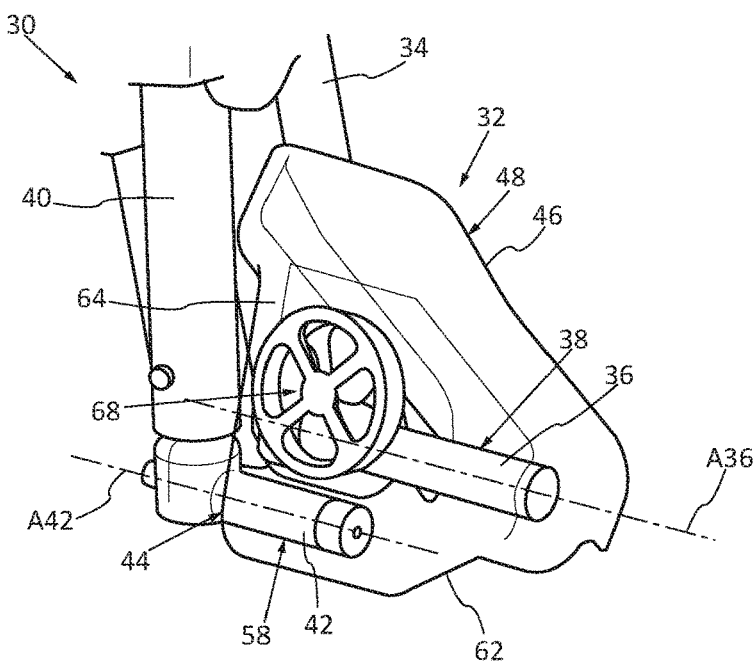
FIG. 3 is a perspective view which shows, by transparence, the interior of a pedal of the set of controls shown in FIG. 2.
Figure 4:
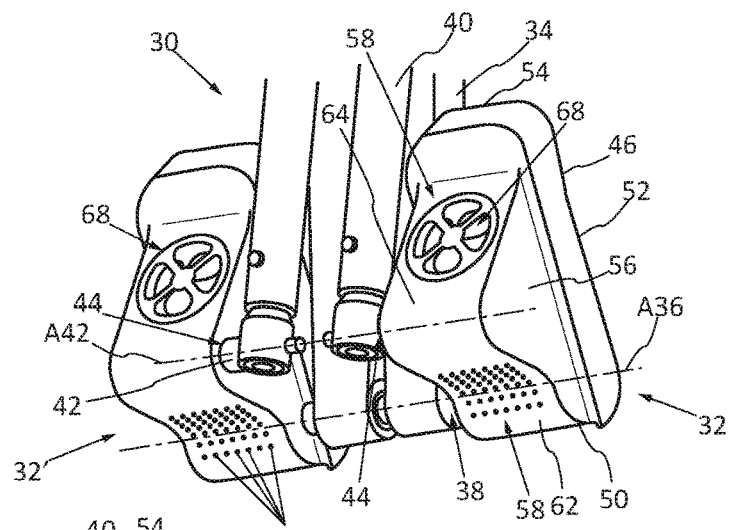
FIG. 4 is a perspective view, from a second viewpoint, of the set of controls shown in FIG. 2.

FIGS. 2 to 8 show a set of two controls 30, each control 30 comprising at least one pedal 32. According to one embodiment shown in FIGS. 2 and 4, the set of controls comprises two pedals 32, 32'.

Each control 30 of the rudder bar type comprises, inter alia:
 a support 34,
 a first rotation shaft 36 connecting the pedal 32 to the support 34, with a first rotation axis A36,
 a first pivot connection 38 configured so as to allow the pedal 32 to pivot about the first rotation axis A36 relative to the support 34,
 a rod 40 whose movements are coordinated with the pivoting movements of the pedal 32.

Thus, the pedal 32 can pivot about the first rotation axis A36 between a rest position and a depressed position when a pilot presses on the pedal 32. Return structure(s) is/are provided in order to keep the pedal in the rest position and/or exert a force counter to the depressing action exerted on the pedal 32.

The other elements of the control 30 and of the set of controls are not shown. They may be identical to those of the prior art.

According to a first, "suspended" assembly, shown in FIGS. 2 to 8, the pedal 32 is connected to the lower end of the support 34, which is suspended.

According to a second, "classic" embodiment, the pedal 32 is connected to the upper end of the support 34, which rests on the floor of the cockpit.

Figure 6:
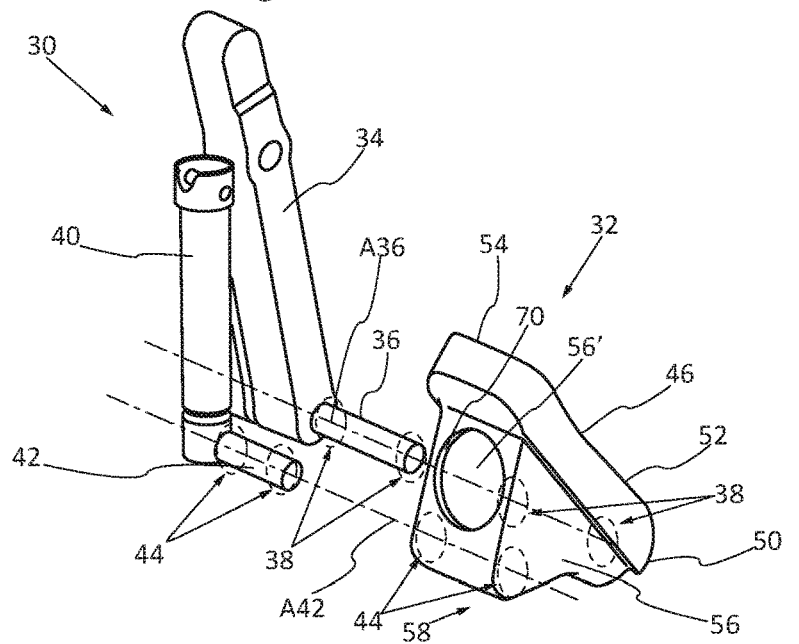
FIG. 6 is an exploded perspective view of a support, a pedal and a rod, which illustrates the first embodiment of the disclosure herein.

According to a first embodiment shown for example in FIG. 6, the first rotation shaft 36 is secured to the support 34 and the first pivot connection 38 is positioned between the pedal 32 and the first rotation shaft 36. According to this first embodiment, the first rotation shaft 36 is created in one piece with at least one part of the support 34 and the pedal 32 comprises at least one bearing surface that is configured so as to receive, in a pivoting manner, the first rotation shaft 36 in order to obtain the first pivot connection 38.

Figure 7:
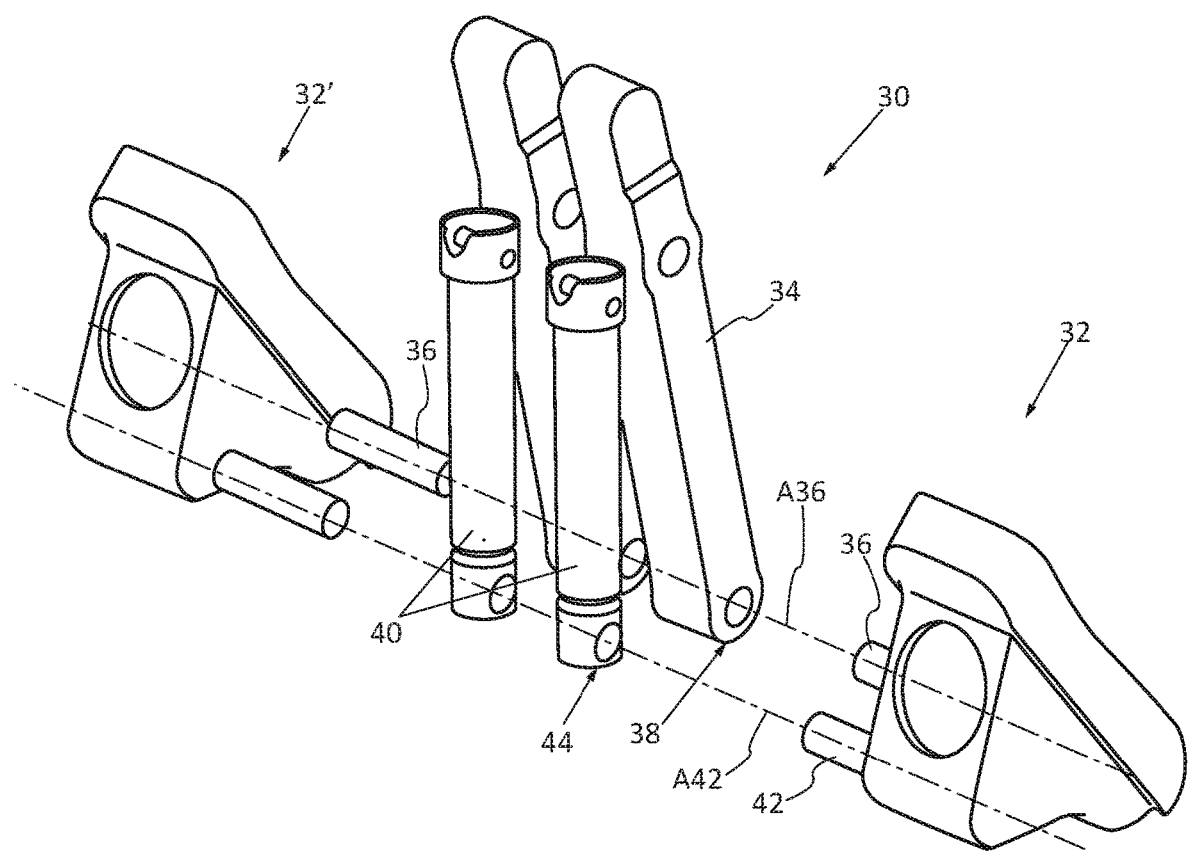
FIG. 7 is an exploded perspective view of a support, a pedal and a rod, which illustrates a second embodiment of the disclosure herein.

According to a second embodiment shown in FIG. 7, the first rotation shaft 36 is secured to the pedal 32 and the first pivot connection 38 is positioned between the support 34 and the first rotation shaft 36. According to this second embodiment, the first rotation shaft 36 is created in one piece with at least one part of the pedal 32 and the support 34 comprises at least one bearing surface that is configured so as to receive, in a pivoting manner, the first rotation shaft 36 in order to obtain the first pivot connection 38.

According to one feature of the disclosure herein, the control 30 comprises:
 a second rotation shaft 42 which has a second rotation axis A42 and of which a first end is connected to the pedal 32 and a second end is connected to the rod 40, and
 a second pivot connection 44 which is configured so as to allow the pedal 32 and/or the rod 40 to pivot about the second rotation axis A42, the second rotation axis A42 being remote from and parallel to the first rotation axis A36.

According to the disclosure herein, the rod 40 is connected to the pedal 32 via the intermediary of the second rotation shaft 42, which is distinct from the first rotation shaft 36 that connects the pedal 32 to the support 34. The first rotation shaft 36 does not transmit forces between the rod 40 and the pedal 32. The rotation shaft 36 has a simple cylindrical shape. According to one advantage obtained with the disclosure herein, the mechanical characteristics of the first rotation shaft 36 are optimized for the transmission of forces between the pedal 32 and support 36, the transmission of forces between the rod 40 and the pedal 32 having very little or even no impact on the dimensions of the first rotation shaft 36.

The disclosure herein also makes it possible to reduce the number of parts (support, pedal, rod), which, excluding the connecting elements, is now three instead of five.

According to a first embodiment shown for example in FIG. 6, the second rotation shaft 42 is secured to the rod 40 and the second pivot connection 44 is positioned between the pedal 32 and the second rotation shaft 42. According to this first embodiment, the second rotation shaft 42 is created in one piece with at least one part of the rod 40 and the pedal 32 comprises at least one bearing surface that is configured so as to receive, in a pivoting manner, the second rotation shaft 42 in order to obtain the second pivot connection 44.

According to a second embodiment shown in FIG. 7, the second rotation shaft 42 is secured to the pedal 32 and the second pivot connection 44 is positioned between the support 40 and the second rotation shaft 42. According to this second embodiment, the second rotation shaft 42 is created in one piece with at least one part of the pedal 32 and the rod 40 comprises at least one bearing surface that is configured so as to receive, in a pivoting manner, the second rotation shaft 42 in order to obtain the second pivot connection 44.

The operating principle of a first control 30 is as follows:

When a first pilot presses on a pedal 32 of the first control 30, the latter pivots in a first sense of rotation about the rotation axis A36 of the first rotation shaft 36. Since the second rotation shaft 42, which connects the first pedal 32 and the rod 40, is parallel to and remote from the first rotation shaft 36, the rotational movement of the first pedal 32 about the rotation axis A36 is converted into a movement of the rod 40 in a first direction. This movement of the rod 40 is then transmitted to a pedal of a second control, positioned in front of a second pilot.

When the first pilot releases the pedal 32 of the first control 30, the return structure(s) cause the pedal 32 to pivot in a second sense of rotation, counter to the first sense of rotation. This rotational movement of the pedal 32 is then converted into a movement of the rod 40 in a second direction counter to the first direction. As indicated previously, this movement of the rod 40 is then transmitted to the corresponding pedal of the second control, positioned in front of the second pilot.

Likewise, when the rod 40 moves in the first direction owing to the pedal of the second control being depressed, this movement is converted into a rotational movement of the pedal 32 of the first control 30 in the first sense of rotation about the rotation axis A36 of the first rotation shaft 36, the rod 40 and the pedal 32 being connected by the second rotation shaft 42 that is parallel to and spaced apart from the first rotation shaft 36. Conversely, when the rod 40 moves in the second direction (counter to the first direction), this movement is converted into a rotational movement of the pedal 32 of the first control 30 in the second sense of rotation about the rotation axis A36 of the first rotation shaft 36.

According to another feature of the disclosure herein, the pedal 32 is box-shaped, which transmits forces between the rod 40 and the pedal 32.

"Box-shaped" means that the pedal 32 comprises a hollow central portion. Thus, the material is provided at the periphery of the pedal 32. This box shape helps to improve rigidity and reduce mass. It also makes it possible to offset the first rotation shaft 36 from the second rotation shaft 42 and to increase the lever arm effect.

As shown in FIGS. 2 to 6, the pedal 32 comprises a contact plate 46 which comprises a contact surface 48 configured to accommodate a pilot's foot. The box shape is positioned at the rear surface of the contact plate 46, parallel to and opposite the contact surface 48. This contact plate 46 is approximately rectangular and comprises a lower edge 50 that is parallel to the first rotation axis A36 and at which is positioned the first rotation shaft 36, two lateral edges 52, 52' that are perpendicular to the first rotation axis A36 and an upper edge 54 that is parallel to the lower edge 50 and spaced apart from the first rotation axis A36.

Figure 5:
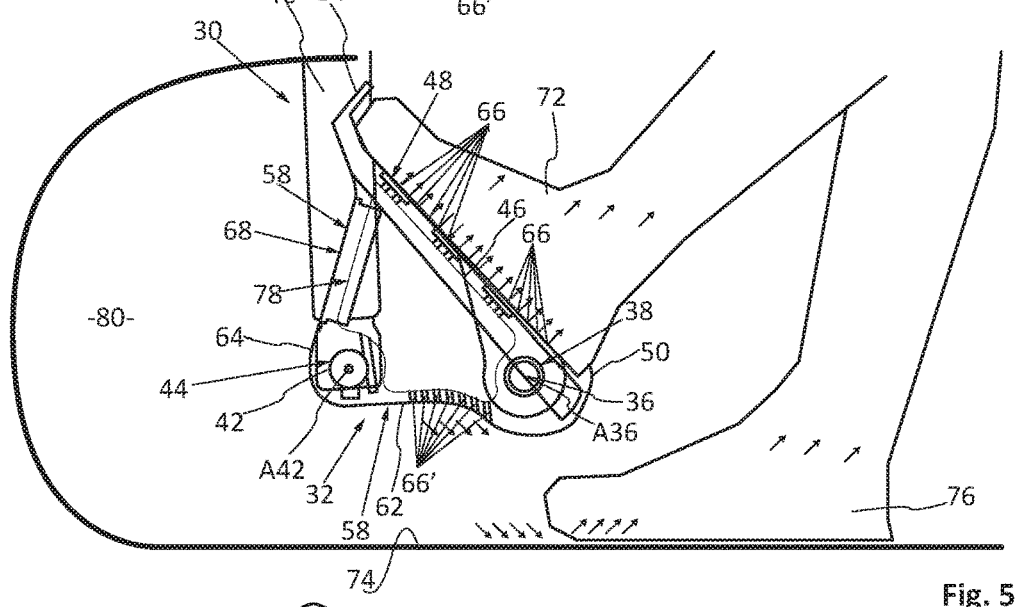
FIG. 5 is a diagram which illustrates the flow of air generated by a pedal according to one embodiment of the disclosure herein.

According to the first embodiment, the pedal 32 comprises, in addition to the contact plate 46, two lateral flanks 56, 56' (shown in FIGS. 2, 4, 6 and 8) that are perpendicular to the contact plate 46 and are connected to the lateral edges 52 and 52', and a rear wall 58 which connects the two lateral flanks 56, 56', the lower edge 50 and upper edge 54 of the contact plate 46, the lateral flanks 56, 56' and the rear wall 58 being configured so as to delimit, with the contact plate 46, an essentially sealed cavity 60 (see FIG. 5). According to one configuration, the lateral flanks 56, 56' each have an approximately triangular shape and the rear wall 58 comprises a first part 62 that is connected to the lower edge 50 and a second part 64 that is connected to the upper edge 54 and is approximately perpendicular to the first part 62. Thus, the pedal 32 has the overall shape of a right prism with a triangular base.

The second rotation shaft 42 is positioned at the zone where the first part 62 and the second part 64 of the rear wall 58 join. Thus, the rotation axes A36 and A42 of the first and second rotation shafts 36 and 42 are arranged in one and the same plane, which is close to and parallel to the first part 62 of the rear wall 58.

According to the first embodiment, the contact plate 46, the two lateral flanks 56, 56' and the rear wall 58 are made in one piece. According to this embodiment, the pedal 32 is for example obtained by molding.

Figure 8:
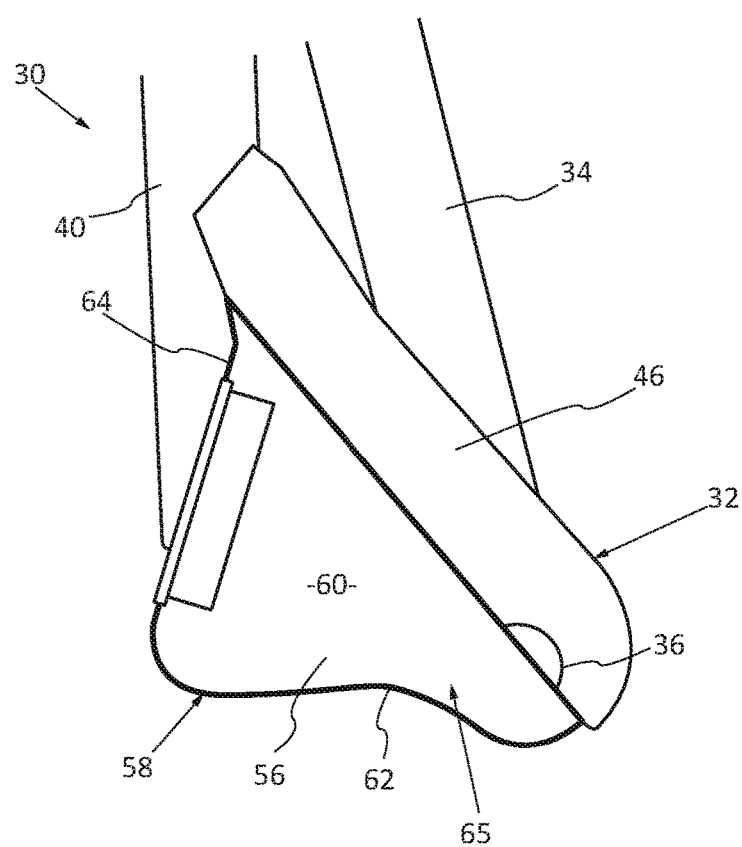
FIG. 8 is a side view of a support, a pedal and a rod, which illustrates a third embodiment of the disclosure herein.

According to a third embodiment, shown in FIG. 8, the pedal 32 comprises the contact plate 46, a half-shell 65 which is distinct from the contact plate 46 and comprises the two lateral flanks 56, 56' and the rear wall 58, and at least one connection connecting the contact plate 46 and the half-shell 65 to form the hollow pedal 32.

According to another feature of the disclosure herein, the box-shaped pedal 32 comprises a plurality of orifices 66 that are configured to connect the interior of the pedal 32 with the exterior, and an airflow generator 68 that is configured to generate a flow of air from the exterior of the pedal 32 to the interior of the pedal 32. Thus, the pedal 32 acts as an air diffuser, the air being drawn from outside the pedal 32, by the airflow generator 68, and pumped to the exterior of the pedal 32 toward at least one appropriate region via the orifices 66.

According to one embodiment, the airflow generator 68 is a fan.

According to the embodiments, the orifices 66 may be cylindrical, oblong or of any other shape.

Preferably, the airflow generator 68 is positioned at the second part 64 of the rear wall 58. To that end, the second part 64 of the rear wall 58 comprises an orifice 70 (shown in FIG. 6) at which the airflow generator 68 is positioned.

Advantageously, the pedal 32 comprises a first set of orifices 66 positioned at the contact plate 46, and/or a second set of orifices 66' positioned at the first part 62 of the rear wall 58 oriented toward the cockpit floor.

Preferably, the orifices 66 of the first set are distributed regularly over almost the entire contact surface 48. According to one embodiment, the contact surface 48 comprises a plurality of regularly distributed recessed shapes, each with a polygonal cross section (preferably square), the orifices 66 of the first set opening into these recessed shapes.

The orifices 66' of the second set are preferably distributed regularly over at least one region of the first part 62 of the rear wall 58. Advantageously, the first part 62 of the rear wall 58 is curved so as to direct and/or concentrate the flow of hot air toward a given region of the cockpit.

As shown in FIG. 5, the orifices 66 of the first set open at the contact surface 48 and generate a flow of air toward a first foot 72 placed on the contact surface 48. In the absence of a foot placed on the contact surface 48, the orifices 66 of the first set direct the flow of air toward the pilot's legs. The orifices 66' of the second set pass through the first part 62 of the rear wall 58 and generate a flow toward a region of the floor 74 where a second foot 76 might be positioned.

Advantageously, the pedal 32 comprises a system 78 for heating the air. According to a first configuration, the heating system 78 is positioned in the pedal 32, for example at the airflow generator 68. According to a second configuration, the air heating system 78 is positioned outside the pedal 32, more particularly in a region 80 that is provided opposite the second part 64 of the rear wall 58.

According to the disclosure herein, the hollow pedal 42 makes it possible to diffuse the heated air toward at least one region where the pilot's feet are positioned, on the contact plate 46 of the pedal 32 and/or on the floor 74 of the cockpit. In the absence of a foot placed on the pedal 32, the orifices 66 of the first set, which open at the contact surface 48, direct the flow of heated air toward the pilot's legs.

Thus, the disclosure herein helps to improve comfort for the pilots, since the region in which the controls 30 are positioned is a confined zone whose temperature is difficult to control, according to the prior art, owing to the proximity of cold, non-pressurized zones located forward of the cockpit and beneath the floor.

Whatever the pilot's body shape, the mechanism for diffusing hot air is always optimally oriented since it is linked to the pedal 32 that has an adjustment system in order to adapt to different body shapes.

According to another advantage provided by the disclosure herein, it is possible to install, on existing pedals, a half-shell 65 equipped with the airflow generator 68 and the heating system 78, in order to improve comfort for the pilot.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft control of a rudder bar type, positioned in an aircraft cockpit, comprising a pedal, a support, a first rotation shaft connecting the pedal to the support with a first rotation axis, a first pivot connection configured to allow the pedal to pivot about the first rotation axis relative to the support, a rod whose movements are coordinated with pivoting motion of the pedal, the aircraft control comprising:
 a second rotation shaft with a second rotation axis, the second rotation shaft being distinct from the first rotation shaft and connecting the pedal to the rod; and
 a second pivot connection configured to allow the pedal and/or the rod to pivot about the second rotation axis, and
 wherein the pedal is box-shaped.

2. The aircraft control as claimed in claim 1, wherein the pedal comprises a contact plate having a contact surface that is configured to receive a pilot's foot, the box shape being positioned at a rear surface of the contact plate.

3. The aircraft control as claimed in claim 2, wherein the pedal comprises a plurality of orifices that are configured to connect an interior of the pedal with an exterior of the pedal, and an airflow generator that is configured to generate a flow of air from the exterior of the pedal to the interior of the pedal.

4. The aircraft control as claimed in claim 3, wherein the pedal comprises a first set of orifices positioned at the contact plate, and/or a second set of orifices positioned at a wall of the pedal oriented toward the cockpit floor.

5. The aircraft control as claimed in claim 3, wherein the pedal comprises a system for heating the air.

6. The aircraft control as claimed in claim 1, wherein the pedal comprises:
 a contact plate that comprises a lower edge which is parallel to the first rotation axis and at which is positioned the first rotation shaft, two lateral edges and an upper edge that is spaced apart from the first rotation axis;
 two lateral flanks that are perpendicular to the contact plate and are connected to the lateral edges; and
 a rear wall which connects the two lateral flanks, the lower and upper edges of the contact plate, the lateral flanks and the rear wall being configured to delimit, with the contact plate, a cavity.

7. The aircraft control as claimed in claim 6, wherein the rear wall comprises a first part that is connected to the lower edge and is oriented toward the cockpit floor, and a second part that is connected to the upper edge, approximately perpendicular to the first part, and wherein the pedal comprises a first set of orifices which open at the contact surface, a second set of orifices which pass through the first part of the rear wall, and an airflow generator which is positioned at the second part of the rear wall.

8. The aircraft control as claimed in claim 1, wherein the first rotation shaft and the second rotation shaft are respectively secured to the support and to the rod, wherein the first pivot connection is positioned between the pedal and the first rotation shaft, and wherein the second pivot connection is positioned between the pedal and the second rotation shaft.

9. An aircraft equipped with an aircraft control of a rudder bar type, the aircraft control positioned in an aircraft cockpit, comprising a pedal, a support, a first rotation shaft connecting the pedal to the support with a first rotation axis, a first pivot connection configured to allow the pedal to pivot about the first rotation axis relative to the support, a rod whose movements are coordinated with pivoting motion of the pedal, the aircraft control comprising:
 a second rotation shaft with a second rotation axis, the second rotation shaft being distinct from the first rotation shaft and connecting the pedal to the rod; and
 a second pivot connection configured to allow the pedal and/or the rod to pivot about the second rotation axis, and
 wherein the pedal is box-shaped.

* * * * *